US008358886B2

(12) United States Patent
Berini et al.

(10) Patent No.: US 8,358,886 B2
(45) Date of Patent: Jan. 22, 2013

(54) WAVEGUIDE FOR PROPAGATING RADIATION

(75) Inventors: Pierre Simon Joseph Berini, Orleans (CA); Robin Andrew Buckley, Ottawa (CA)

(73) Assignee: The University of Ottawa, Ottawa (CA)

(*) Notice: Subject to any disclaimer, the term of this patent is extended or adjusted under 35 U.S.C. 154(b) by 407 days.

(21) Appl. No.: 12/628,655

(22) Filed: Dec. 1, 2009

(65) Prior Publication Data
US 2010/0150512 A1  Jun. 17, 2010

Related U.S. Application Data

(60) Provisional application No. 61/119,214, filed on Dec. 2, 2008.

(51) Int. Cl.
*G02B 6/26* (2006.01)
*G02B 6/42* (2006.01)

(52) U.S. Cl. .............................. 385/32; 385/40; 385/41

(58) Field of Classification Search ........................ None
See application file for complete search history.

(56) References Cited

U.S. PATENT DOCUMENTS
6,166,614 A * 12/2000 Ishikawa et al. .............. 333/239

* cited by examiner

*Primary Examiner* — Jerry Rahll
(74) *Attorney, Agent, or Firm* — Thomas Adams

(57) ABSTRACT

A low-loss waveguide that can be curved aggressively, that is, curved with a radius of curvature that is substantially zero, in the plane of propagation, without radiating, is formed by a slab of dielectric material having four metal plates, two on each opposite surface of the slab and mutually spaced to define in the dielectric slab between the four metal plates a confinement zone. In use, electromagnetic radiation injected in one end of the zone by suitable input means will propagate throughout the zone to an extraction means. Lower loss and better confinement of the radiation may be obtained by providing plugs of dielectric material adjacent the inwardly-facing edge of each of the metal plates. Embodiments of the invention can be used to implement integrated optical devices and circuits for routing or processing light signals.

23 Claims, 16 Drawing Sheets

Fig. 7A
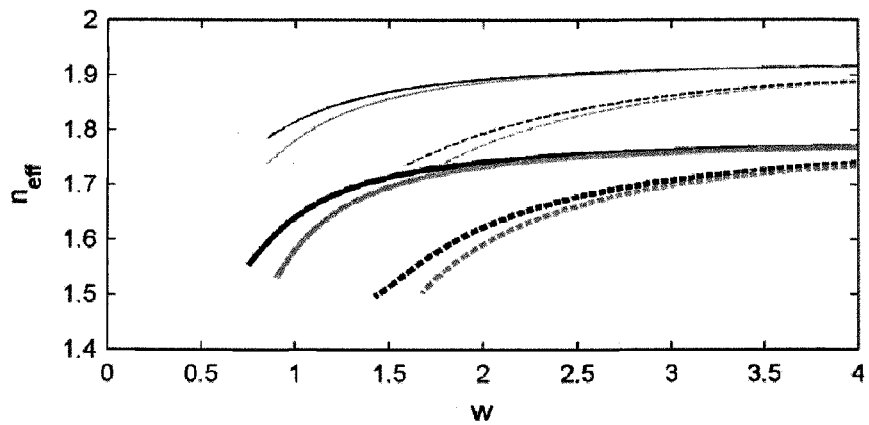
Fig. 7B
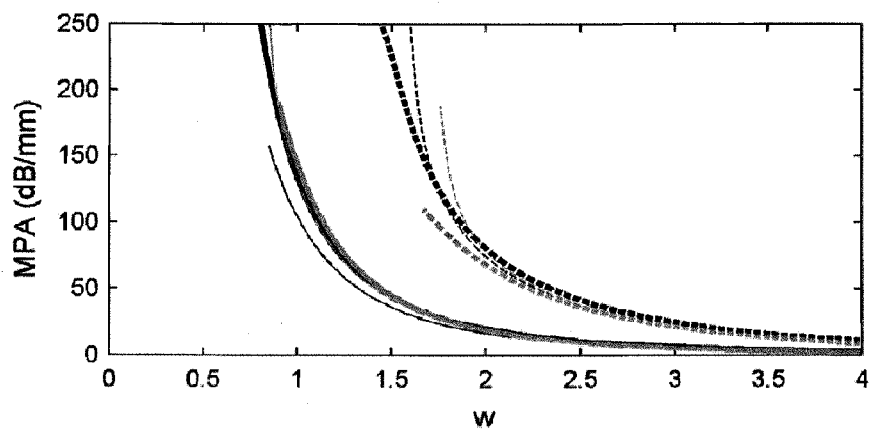
Fig. 7C
— $E_{11}^p$; s=500nm, t=200nm       ----- $E_{21}^p$; s=500nm, t=200nm
— $E_{11}^p$; s=300nm, t=200nm   ----- $E_{21}^p$; s=300nm, t=200nm
— $E_{11}^p$; s=500nm, t=100nm       ----- $E_{21}^p$; s=500nm, t=100nm
— $E_{11}^p$; s=300nm, t=100nm       ····· $E_{21}^p$; s=300nm, t=100nm

WAVEGUIDE FOR PROPAGATING RADIATION

CROSS-REFERENCE TO RELATED APPLICATIONS

This application claims priority from U.S. Provisional patent application No. 61/119,214 filed Dec. 2, 2008, the contents of which are incorporated herein by reference.

TECHNICAL FIELD

This invention relates to waveguides for propagating electromagnetic radiation, especially radiation having a wavelength in the range encompassing ultra-violet, visible, near infra-red, mid infra-red, far infra-red, millimeter-waves and microwaves, and is especially applicable to optical waveguides that can be used to implement integrated optical devices and circuits for routing or processing optical energy, for example optical signals.

BACKGROUND

This specification refers to several published articles. For convenience, these articles are referenced in full in a numbered list at the end of the description and cited by number in the specification itself. The contents of these articles are incorporated herein by reference and the reader is directed to them for reference.

Fundamental difficulties in creating optical systems or components reside in the simple notions of confining, guiding and redirecting optical energy with relatively low loss, while consuming as little area as possible on a wafer or chip bearing the system or component. The area consumed depends directly on the ability of the chosen optical waveguide to redirect light through bending in the plane of propagation. The smaller the radius of curvature, the smaller the area required to change the direction of propagation. However, in general, as the radius of curvature is decreased beyond a minimum radius set by the waveguide design and operating wavelength, light radiates increasingly out of the waveguide, increasing the loss. Thus, in practice, the minimum radius sets a lower bound on the minimum area needed.

Dielectric waveguides, for example, can provide a nearly lossless means for mode confinement when straight (or bent only slightly) but become significantly radiative when bent aggressively [1-4]. When used in this specification in connection with optical waveguides, "bending aggressively" is intended to embrace bending radii that tend to substantially zero ($r_0 \rightarrow 0$). A surface plasmon-polariton (SPP) waveguide can support a mode that is long-range (low propagation loss) but has relatively low confinement, such that it radiates significantly when bent aggressively [5-11]; or that has relatively strong confinement and can be bent aggressively but has a relatively high propagation loss [12-16].

Years ago Yoneyama and Nishida disclosed a non-radiative dielectric (NRD) waveguide [17, 18] for use at microwave frequencies. As shown in FIG. 1, labelled PRIOR ART, their NRD waveguide comprises two metal plates with a core of dielectric material between them and air on either side of the core. When dimensioned properly, the NRD becomes non-radiative in the plane of propagation such that low-loss aggressive bends can be implemented.

The NRD has been worked on extensively over the years to produce many microwave integrated circuit devices [19, 20] and the possibility of using a similar structure at optical wavelengths has been considered. However, recent analysis of the NRD (and similar structures) at optical wavelengths [21,22] revealed that the modes experience relatively large propagation loss due to coupling to SPPs, and that they become highly deformed, and effectively unusable, when the waveguide is bent aggressively. The key benefits of the NRD at microwave frequencies are therefore lost when it is rescaled for optical use [22].

SUMMARY OF INVENTION

The present invention seeks to eliminate, or at least mitigate, the disadvantages of these known waveguides, and provide a waveguide structure capable of guiding optical energy that can be bent aggressively, such that changes in direction can be made while consuming as little area as possible in the propagation plane.

To this end, according to one aspect of the present invention, there is provided a device comprising a waveguide structure for propagating electromagnetic radiation formed by a slab of dielectric material, a first pair of metal plates and a second pair of metal plates each pair comprising a first and a second metal plate extending in a propagation direction on opposite faces of the slab, the plates on each face of the slab being spaced apart laterally with respect to the propagation direction, dielectric cladding material disposed along each of the opposite faces of the slab and having a refractive index less than the refractive index of the slab, and a plurality of plugs of dielectric material each plug extending alongside an inwardly-facing edge of a respective one of the four metal plates, the refractive index of each of the dielectric plugs being greater than the respective refractive indices of the slab and the cladding material, the device further comprising input means for injecting electromagnetic radiation into the slab to propagate in said propagation direction in a zone defined by and between the four metal plates.

Features of preferred embodiments of this invention are set out in the attached listing of claims as dependent directly or indirectly upon the independent claim.

The foregoing and other objects, features, aspects and advantages of the present invention will become more apparent from the following detailed description, taken in conjunction with the accompanying drawings, of preferred embodiments of the invention, which are described by way of example only.

BRIEF DESCRIPTION OF DRAWINGS

In the drawings, identical or corresponding elements in the different Figures have the same reference numeral.

FIGS. 7A and 7B show the effective index and propagation loss, respectively, of the $E^p_{11}$ and $E^p_{21}$ modes of the straight ($r_0 \to \infty$) MDW as a function of the width w; and FIG. 7C shows the legend for FIGS. 7A and 7B;

FIG. 9A shows the main transverse electric field component $E_\rho$ for a straight ($r_0 \to \infty$) MDW (w=1.7 µm, s=300 nm, t=100 nm). FIGS. 9B and 9C show $E_\rho$ and $E_z$, respectively, for a curved MDW (w=1.7 µm, s=300 nm, t=100 nm, $r_0$=0.4 µm) having s such that all parallel plate modes are cutoff except the $s_b^0$ mode, which is guided as s→0. FIGS. 9D and 9E show $E_\rho$ and $E_z$, respectively, for a curved MDW (w=1.7 µm, s=500 nm, t=100 nm, $r_0$=5.15 µm) having s such that the $a_b^0$ and $s_b^1$ modes are not cut-off.

DESCRIPTION OF PREFERRED EMBODIMENTS

Metallo-Dielectric Waveguide (MDW) Structure

Throughout this disclosure, and as a matter of convenience, waveguides embodying the present invention are referred to as metallo-dielectric waveguides (MDWs), given the prevalence of metals and dielectrics in their construction.

FIGS. 2A through 2E illustrate in the cylindrical coordinate system (ρ-φ-z) preferred embodiments of MDWs.

Figure 1:
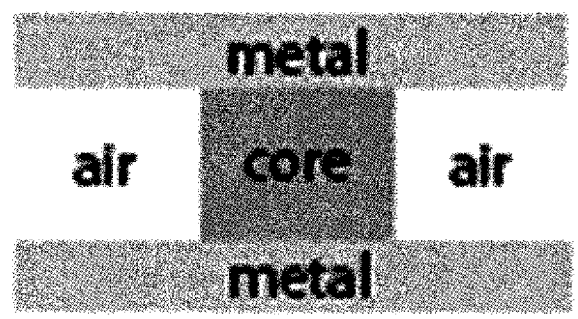
FIG. 1, labelled PRIOR ART, illustrates, in cross section, a Non-Radiative Dielectric (NRD) waveguide.
Figure 2A:
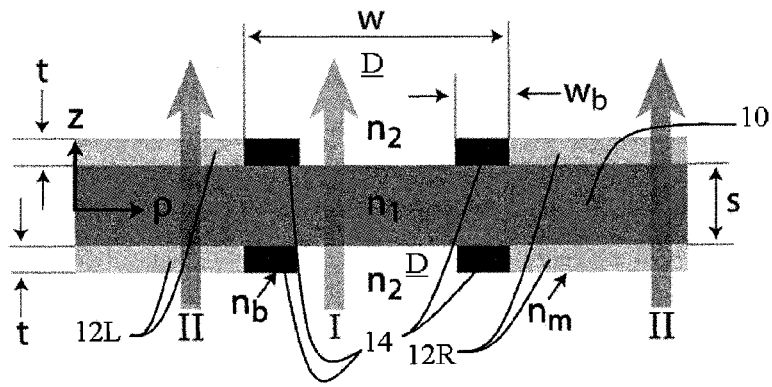
FIG. 2A illustrates as a front cross sectional view a Metallo-Dielectric Waveguide (MDW) embodying the present invention.

FIG. 2A illustrates a front cross-sectional view of the MDW. The MDW comprises a dielectric slab 10 of thickness s and refractive index $n_1$. The dielectric slab is clad in Region I by dielectrics D of lower refractive index $n_2$ ($n_2 < n_1$), and in Regions II by parallel metal plates 12L and 12R of thickness t and refractive index $n_m$. The pair of metal plates 12L on opposite sides of slab 10 (shown at the left hand side in FIG. 2A) are in register with each other. Likewise, the pair of metal plates 12R (shown at the right hand side in FIG. 2A) on opposite sides of the slab 10 are in register with each other. Region I is referred to as the "dielectric waveguide" region, and regions II as the "parallel-plate waveguide" regions. The MDW is a composite waveguide formed by combining a dielectric waveguide (Region I) with two parallel-plate waveguides (Regions II) separated laterally by w; w and s are henceforth referred to as the MDW width and thickness, respectively. Four additional dielectric regions 14, each of width $w_b$, thickness t and refractive index $n_b$ are added near the metal plates in the locations shown; these regions are henceforth referred to as "dielectric plugs". The top and bottom claddings D are shown here as having the same refractive index $n_2$, but could in fact comprise different materials each having a different refractive index as long as they are both lower than $n_1$, the refractive index of the dielectric slab 10. Likewise, the metal plates 12L and 12R could each comprise a different metal, each having a different refractive index. The dielectric plugs 14 could each comprise a different dielectric, each having a different refractive index.

Figure 2B:
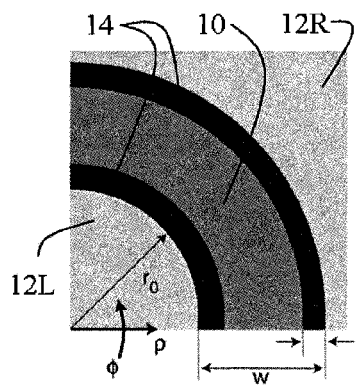
FIGS. 2B and 2C illustrate in top view 90° curved sections of the MDW with an arbitrary radius of curvature $r_0$, and with $r_0=0$, respectively.
Figure 2C:
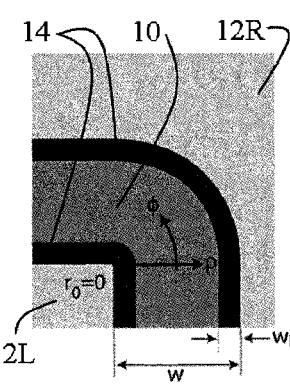
Figure 2D:
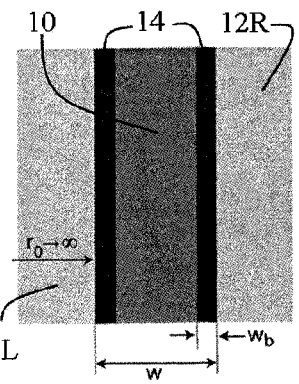
FIG. 2D illustrates in top view a straight section ($r_0 \rightarrow \infty$) of MDW.

FIG. 2B illustrates in top view a 90° curved section of the MDW having an arbitrary radius of curvature $r_0$. FIG. 2C illustrates in top view a 90° curved section of the MDW having an aggressive radius of curvature $r_0 \to 0$. FIG. 2D illustrates in top view a straight section ($r_0 \to \infty$) of MDW.

Figure 2E:
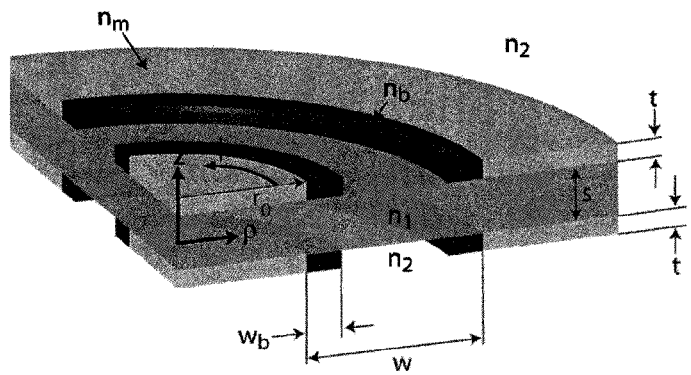
FIG. 2E illustrates in isometric view a 90° curved section of MDW with an arbitrary radius of curvature $r_0$.

FIG. 2E illustrates in isometric view a 90° curved section of MDW with an arbitrary radius of curvature $r_0$. Any radius of curvature ($0 \leq r_0 \leq \infty$) and any curve angle between 0° and 90° can be implemented using the MDW.

FIGS. 15A through 15E illustrate alternative embodiments of MDWs, similar to those sketched in FIGS. 2A through 2E respectively, except without the dielectric plugs 14 of the latter.

Figure 3A:
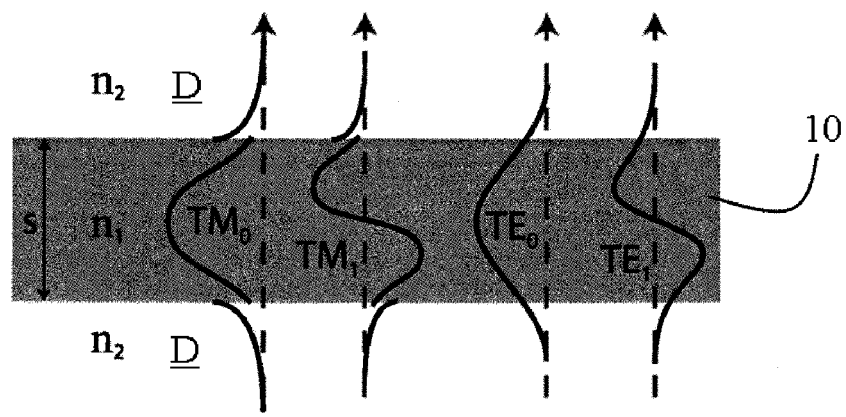
FIG. 3A illustrates a straight one-dimensional dielectric optical waveguide and the main transverse electric field component of the first few modes supported therein.
Figure 3B:
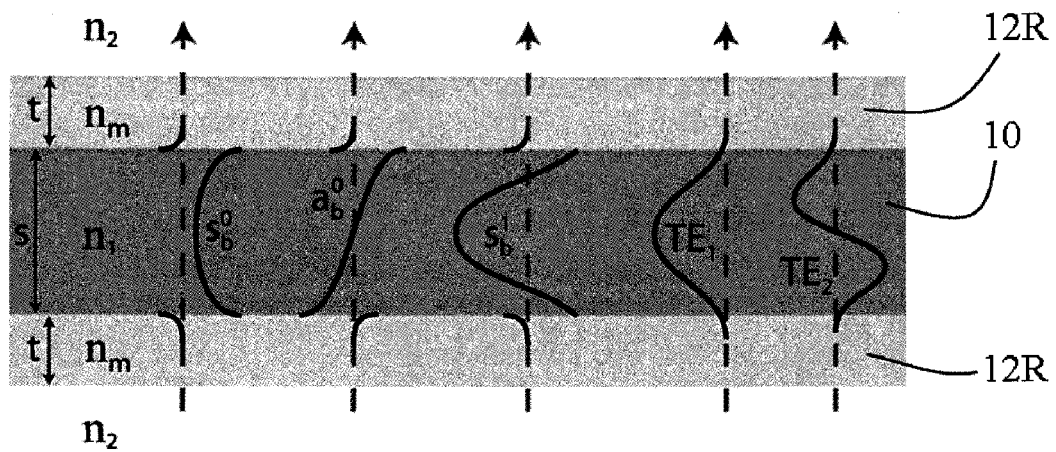
FIG. 3B illustrates a straight one-dimensional parallel plate optical waveguide and the main transverse electric field component of the first few modes supported therein.

MDW Design Considerations:

In order to provide insight on the operation of the MDW, the dielectric waveguide (Region I) and the parallel-plate waveguide (Regions II) were analyzed independently as the 1D waveguides sketched in FIGS. 3A and 3B. The computations were performed using the Transfer Matrix Method [24] at a free-space operating wavelength of $\lambda_0$=1550 nm. The dielectric slab 10 used as the core of the dielectric waveguide (FIG. 3A) and as the core of the parallel-plate waveguide (FIG. 3B) was assumed to be an isotropic dielectric of index $n_1$=2.1375, representative of $Si_3N_4$ (n~2.0) and other high index dielectrics and crystals. The upper and lower claddings D of the dielectric waveguide (FIG. 3A) were assumed to be isotropic dielectrics of index $n_2$=1.444, representative of $SiO_2$, optical polymers, and other dielectrics. The metal plates 12R of the parallel-plate waveguide (FIG. 3B) were assumed to be highly conductive, comprising, for example, Au, having an index $n_m$=$(131.95-j12.65)^{0.5}$, and of thickness t much greater than the field penetration depth therein.

Figure 4A:
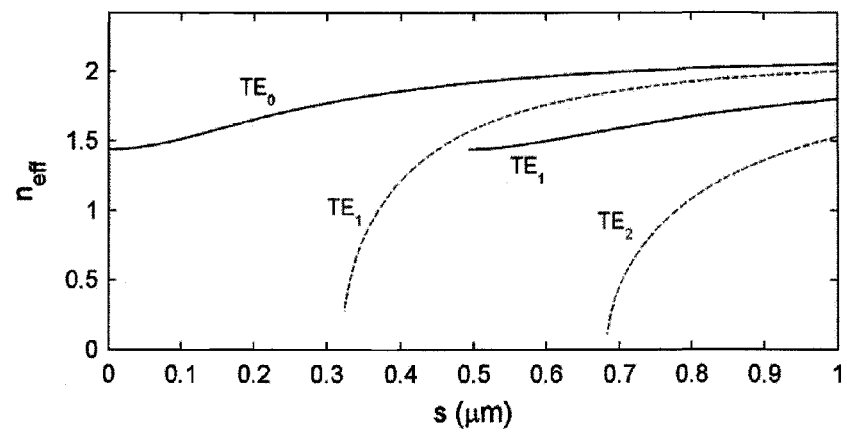
FIGS. 4A and 4B show plots of the effective index of the TE and TM modes respectively, as a function of core thickness, s, for two straight one-dimensional waveguides.
Figure 4B:
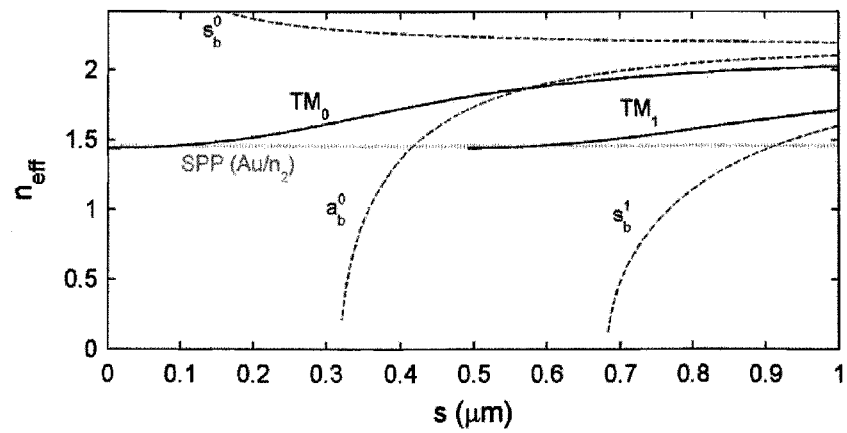

FIGS. 4A and 4B plot the computed effective index ($n_{eff}$) of the first few TE and TM modes that exist in the dielectric waveguide (dark solid curves), and in the parallel-plate waveguide (dashed gray curves), as a function of the dielectric slab thickness s. The effective index of the single interface SPP guided along the Au-$n_2$ interfaces of the parallel-plate waveguide is also plotted in FIG. 4B, for reference. The distribution of the main transverse electric field component of these modes is sketched onto FIGS. 3A and 3B.

From FIGS. 4A and 4B it is noted that the effective index of the $TE_0$ mode of the dielectric waveguide remains above that of all other modes shown (the single interface SPP at the Au-$n_2$ interfaces and the parallel plate modes $TE_1$, $TE_2$, $a_b^0$, $s_b^1$) for s>37 nm, except for the parallel-plate $s_b^0$ mode.

The fundamental horizontally-polarized mode of the MDW (FIG. 2A) is denoted $E^p_{11}$, and resembles in character, polarization and effective index the $TE_0$ mode of the dielectric slab, so the results plotted in FIGS. 4A and 4B help elucidate its confinement mechanisms. The $E^p_{11}$ mode is confined horizontally to the width w of Region I by the parallel plate waveguides (Regions II), because its effective index is larger than that of all parallel-plate modes and the single-interface SPP at the Au-$n_2$ interfaces. The parallel-plate $s_b^0$ mode is of no concern in this case because it is substantially orthogonal to the $E^p_{11}$ mode. The $E^p_{11}$ mode is confined vertically to the thickness s in Region I by the steps in refractive index at the top and bottom interfaces between the slab (10) and the claddings (D). The $E^p_{11}$ mode therefore occupies the area w×s (roughly) of Region I. The MDW produces both vertical and horizontal confinement for this mode for any thickness s. The width of the parallel-plate waveguides (Regions II) is selected to be large enough for them to be optically infinite.

These confinement mechanisms hold for straight (FIG. 2D) and curved (FIG. 2B) MDWs in general, but if a thickness of s<300 nm is chosen for the case modeled in FIGS. 4A and 4B, then aggressive radii of curvature ($r_0 \rightarrow 0$ and $r_0=0$, FIG. 2C) can be used because all of the parallel-plate modes are cut off, leaving only the orthogonal $s_b^0$ mode. In this case, the parallel plates effectively reduce the optical density of states in the plane of propagation such that there are no modes for the $E^p_{11}$ mode to radiate into. Thus, in general, it is particularly desirable to select the thickness s of the dielectric slab 10 to cut-off as many of the parallel-plate modes as possible. Under this condition, the MDW is said to be "substantially non-radiative".

The straight MDW ($r_0 \rightarrow \infty$, FIG. 2D) was then modeled; the computations were performed using the finite element method and the method of lines [7]. In an attempt to reduce the propagation loss of the $E^p_{11}$ mode, small dielectric regions of relatively high or low refractive index were placed strategically at many different locations in the MDW cross-section. After much modeling, it was found that placing relatively small high-index plugs (14) along the edge of the metal plates (12L and 12R), as shown in FIG. 2A, reduced the propagation loss by at least one order of magnitude.

Figure 5A:
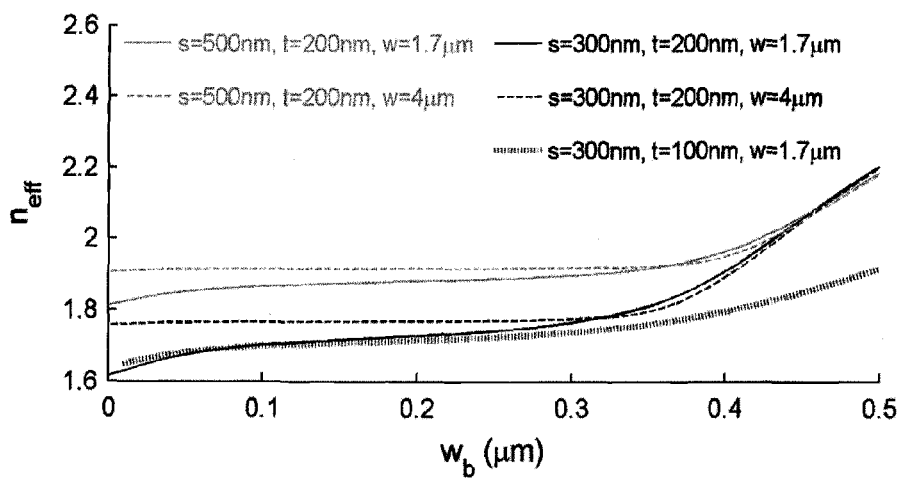
FIGS. 5A and 5B show the effective index and propagation loss, respectively, of the $E^p_{11}$ mode of the straight ($r_0 \to \infty$) MDW as a function of plug width, $w_b$.
Figure 5B:
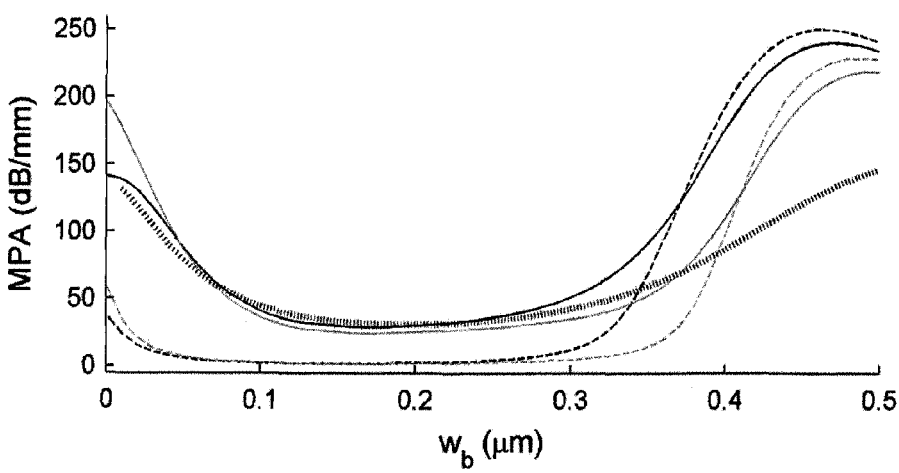

FIGS. 5A and 5B give the effective index and propagation loss, respectively, of the $E^p_{11}$ mode of the straight MDW as a function of the plug width $w_b$. An index of $n_b=3.4757$ (Si) was assumed for the plug. The other material parameters and the operating wavelength were set to the same values as in FIGS. 4A and 4B. Two dielectric slab thicknesses s=300, 500 nm, two metal plate thicknesses t=100, 200 nm, and two waveguide widths w=1.7, 4 μm are shown as examples. The high-index dielectric plugs (14) have a dramatic effect on the attenuation of the $E^p_{11}$ mode, and when dimensioned properly, the plugs lower the propagation loss by more than one order of magnitude as shown in FIG. 5B. In the low loss region ($0.1 \leq w_b \leq 0.3$ μm, approximately), the dielectric plugs repel the fields away from the metal. When the plugs are too narrow ($w_b \leq 0.1$ μm, approximately), the $E^p_{11}$ mode interacts strongly with the metal edges increasing its propagation loss and effective index. At the other extreme, when the plugs are too large ($w_b \geq 0.3$ μm, approximately), they support their own guided modes with fields confined within the plugs and interacting strongly with the metal edges, transforming the character of the $E^p_{11}$ mode and increasing its propagation loss and effective index.

Figure 6A:
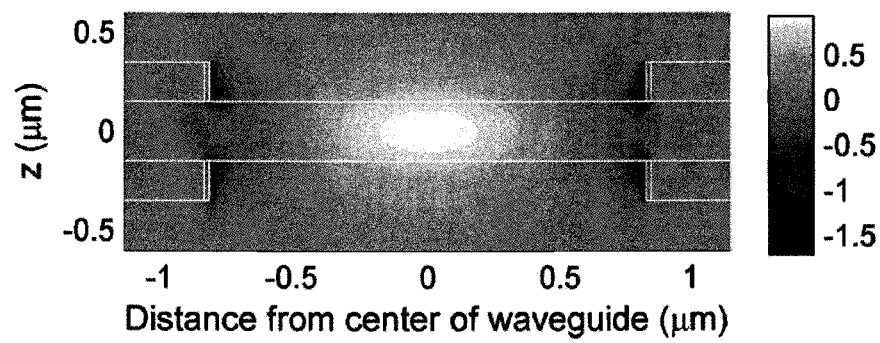
FIGS. 6A, 6B and 6C show the $E_\rho$ field component of the $E^p_{11}$ mode of the straight ($r_0 \to \infty$) MDW for various plug widths $w_b$=20, 200 and 400 nm, respectively; in all three cases the waveguide dimensions are s=500 nm, w=1.7 µm and t=200 nm.
Figure 6B:
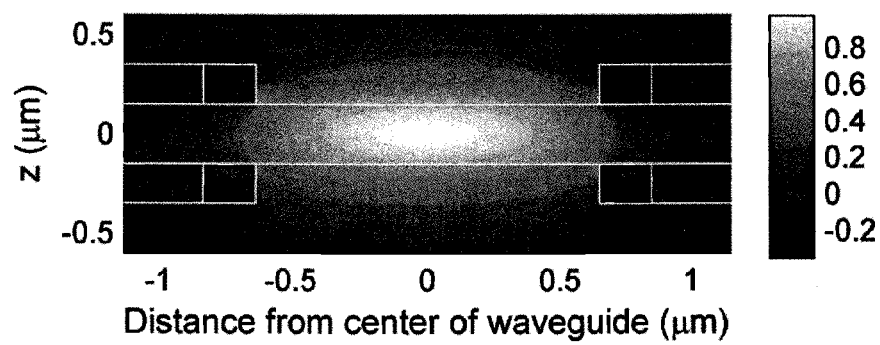
Figure 6C:
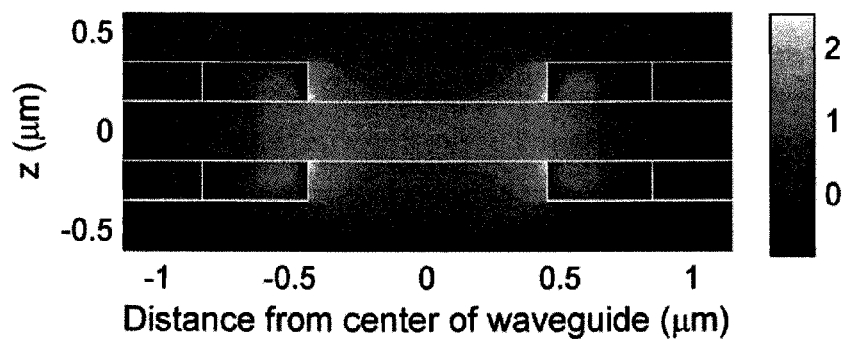

FIGS. 6A, 6B and 6C show the $E_\rho$ field component of the $E^p_{11}$ mode for $w_b=20$, 200 and 400 nm, respectively, with the other dimensions set to s=500 nm, w=1.7 μm and t=200 nm. The outline of the MDW is also sketched in white on all three figures for reference. From FIG. 5B, $w_b=20$ and 400 nm are noted to be in the high loss regions, and FIGS. 6A and 6C show the mode interacting strongly with the metal edges thus causing higher loss. From FIG. 5B $w_b=200$ nm is noted to be in the low loss region, and FIG. 6B shows the mode well centered and isolated from the metal edges by the plugs thus decreasing the loss. FIG. 6C also shows the mode localized to the four plugs, rather than having a single field maximum centered in the MDW as in the case of FIG. 6B.

FIGS. 7A and 7B give the effective index and propagation loss, respectively, of the $E^p_{11}$ and $E^p_{21}$ modes of the straight MDW as a function of the width w. The material parameters and operating wavelength were set to the same values as in FIGS. 5A and 5B. Two dielectric slab thicknesses s=300, 500 nm and two metal plate thicknesses t=100, 200 μn are shown as examples. The dielectric plug width was set to $w_b=200$ nm. The $E^p_{21}$ mode is the first higher-order mode that is guided as the width w is increased. The propagation loss of the $E^p_{11}$ and $E^p_{21}$ modes increases drastically as the cut-off width is approached, at w~1 and 1.75 μm, respectively. The waveguide is observed to be single-mode ($E^p_{11}$ only) for 1<w<1.75 μm (approximately). The thicker waveguides (s=500 nm) have a lower propagation loss than the corresponding thinner ones (s=300 nm), although they lack the non-radiative character as discussed above (and further below). The propagation loss of the $E^p_{11}$ mode decreases to 1.2 dB/mm for w=5 μm. When designing components, wider straight sections could be used to propagate the mode over long distances, then a short aggressive non-radiative transition could be inserted to reduce the MDW width to a narrower single-mode section before, say, bending.

Figure 8:
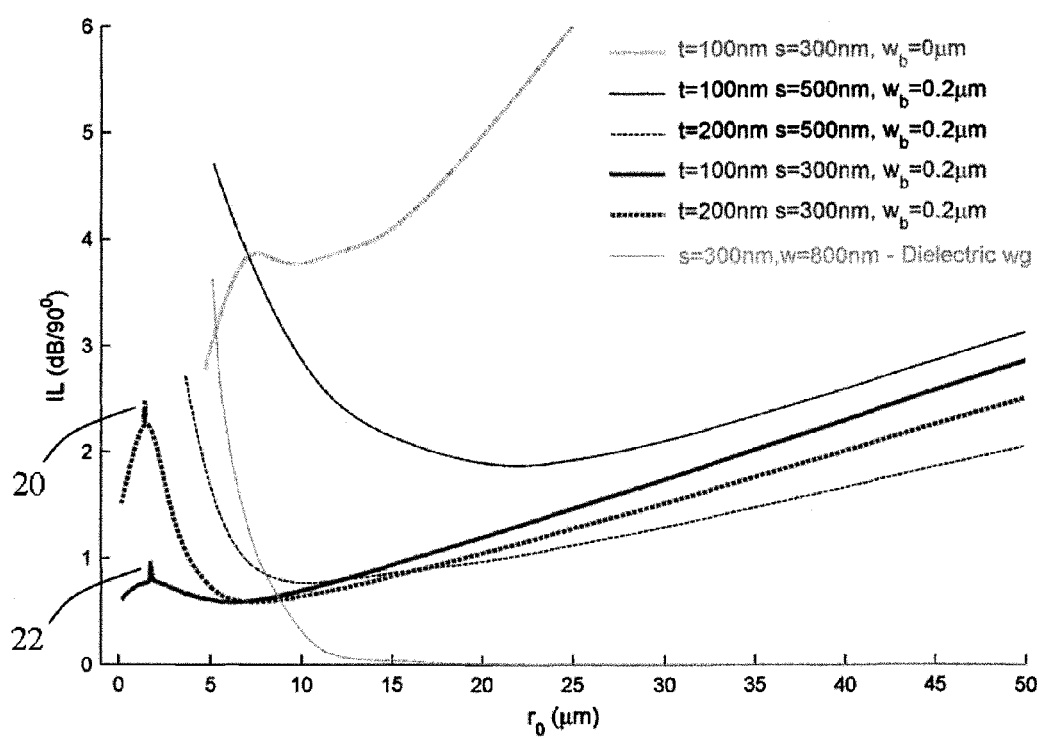
FIG. 8 shows the insertion loss of 90° curved waveguides of various designs.

FIG. 8 shows the insertion loss of the $E^p_{11}$ mode in 90° curved MDWs (FIG. 2B) of various designs as a function of the radius of curvature $r_0$. The material parameters and operating wavelength were set to the same values as in FIGS. 5A and 5B. Two dielectric slab thicknesses s=300, 500 nm and two metal plate thicknesses t=100, 200 nm are shown as examples. The dielectric plug width was set to $w_b=200$ nm in all cases except one where it was set to $w_b=0$. The insertion loss of the $E^p_{11}$ mode in a comparable 90° curved high-confinement single-mode rectangular dielectric waveguide was also computed for reference; the dielectric waveguide had a thickness s=300 nm and width w=800 nm with core and cladding indices of $n_1=2.1375$ and $n_2=1.444$, respectively. The computations were performed using the Method of Lines in cylindrical co-ordinates [6].

From FIG. 8, it is noted that the best performance is obtained with the MDW design having s=300 nm, t=100 nm and $w_b=200$ nm; this design produces a relatively low insertion loss at a relatively aggressive bending radius $r_0$, outperforming even the high-confinement dielectric waveguide, because all of the parallel-plate modes are cut-off except the orthogonal $s_b^0$ mode. This design is capable of producing an insertion loss of only 0.61 dB/90° at $r_0=150$ nm. Numerical limitations restricted $r_0$ from reaching zero but it is expected that the insertion loss will continue to decrease as $r_0 \rightarrow 0$ (FIG. 2C), as the trend suggests. Features 20 and 22 are noted in FIG. 8 on the insertion loss curves of the 300 nm thick MDWs at $r_0 \sim 2$ μM. Inspection of the fields (not shown) reveals that optical resonances occur involving the dielectric plugs at these radii. The other MDW designs were chosen with a thickness of $s=500$ nm; the minimum radius of curvature in these cases is significantly larger due to radiation into non cut-off parallel-plate modes.

The effect of the dielectric plugs 14 (FIG. 2A) is apparent from FIG. 8 illustrating the results for the MDW design having $w_b=0$. As mentioned before, the straight case with no plugs ($r_0 \to \infty$, $w_b=0$) has strong field localization to the edges of the metal plates. This localization increases in a curved structure as $r_0$ decreases. Inspection of the mode fields (not shown) reveals radiation of the $E^p_{11}$ mode into single-interface SPPs near $r_0=20$ μm. At approximately $r_0=9$ μm the insertion loss begins to decrease again, but the field concentration along the inner metal edges increases and the $E^p_{11}$ mode changes appreciably in character. While including the dielectric plugs 14 is clearly preferred (FIGS. 2A to 2E), the MDW without the dielectric plugs (FIGS. 15A to 15E) still operates, albeit with greater loss.

Figure 9A:
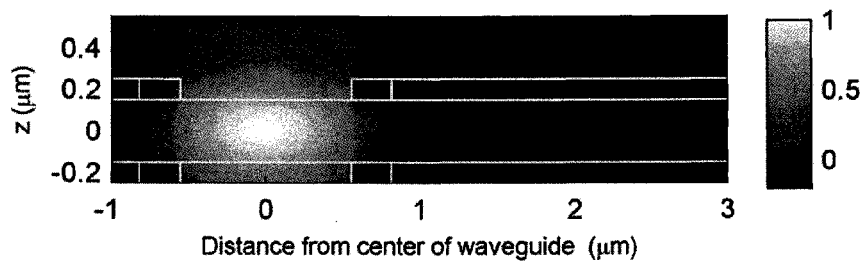
FIGS. 9A-9E show the $E^p_{11}$ mode fields of various MDWs.
Figure 9B:
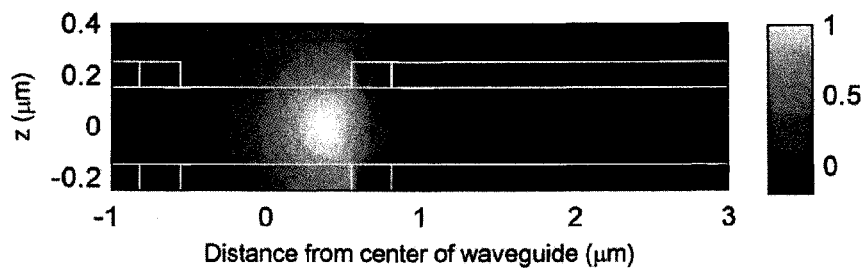
Figure 9C:
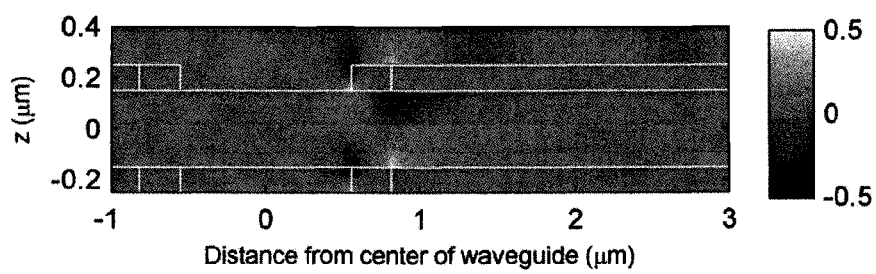
Figure 9D:
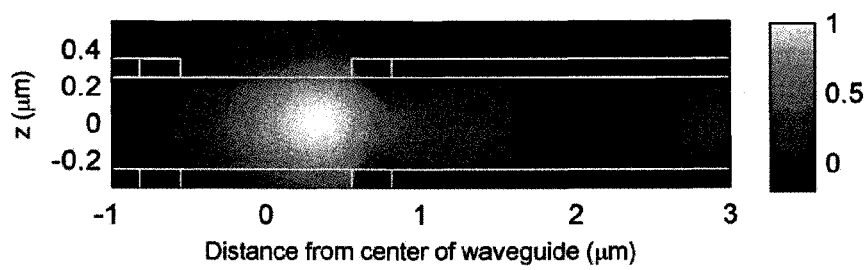
Figure 9E:
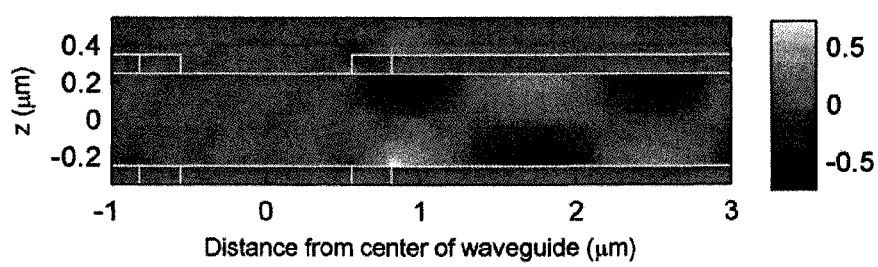

FIGS. 9A-9E show the $E^p_{11}$ mode fields of various MDWs, with the MDW cross-section sketched in white over the field distribution. The material parameters and operating wavelength were set to the same values as in FIGS. 5A and 5B. FIG. 9A shows the main transverse electric field component $E_\rho$ for a straight ($r_0 \to \infty$, FIG. 2D) MDW ($w=1.7$ μm, $s=300$ nm, $t=100$ nm, $w_b=200$ nm). FIGS. 9B and 9C show $E_\rho$ and $E_z$, respectively, for an aggressively curved MDW ($w=1.7$ $s=300$ nm, $t=100$ nm, $w_b=200$ nm, $r_0=0.4$ μm, FIG. 2B) having s such that all parallel plate modes are cutoff except the $s_b^0$ mode (which is guided as $s \to 0$). No radiation is observed inside the parallel plate sections for this design, and no coupling is observed with the parallel-plate se mode as expected because of orthogonality. Only negligible leakage occurs into single interface SPPs at the upper/lower Au-$n_2$ interfaces, as is apparent in FIG. 9C, and into plane waves above and below the metal plates. This MDW design is therefore substantially non-radiative. FIGS. 9D and 9E show $E_\rho$ and $E_z$, respectively, for a curved MDW ($w=1.7$ μm, $s=500$ nm, $t=100$ nm, $w_b=200$ nm, $r_0=5.15$ μm, FIG. 2B) having s such that the $a_b^0$ and $s_b^1$ modes are not cut-off. In this case, radiation is clearly leaking into the $a_b^0$ and $s_b^1$ modes of the outer parallel-plate waveguide.

Figure 10A:
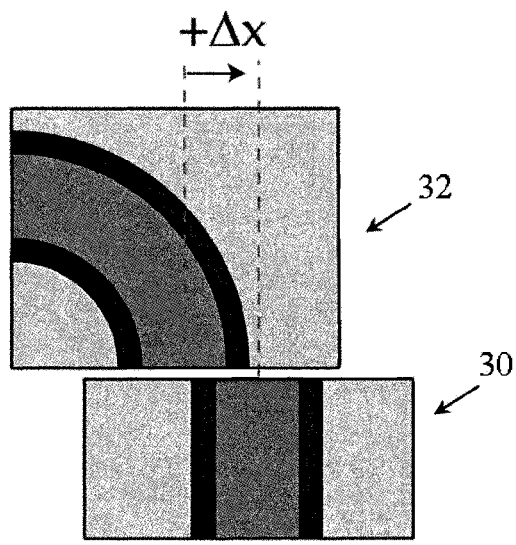
FIG. 10A shows as a top view a straight ($r_0 \to \infty$) MDW butt coupled to a curved MDW with a centre-to-centre lateral offset of Δx.
Figure 10B:
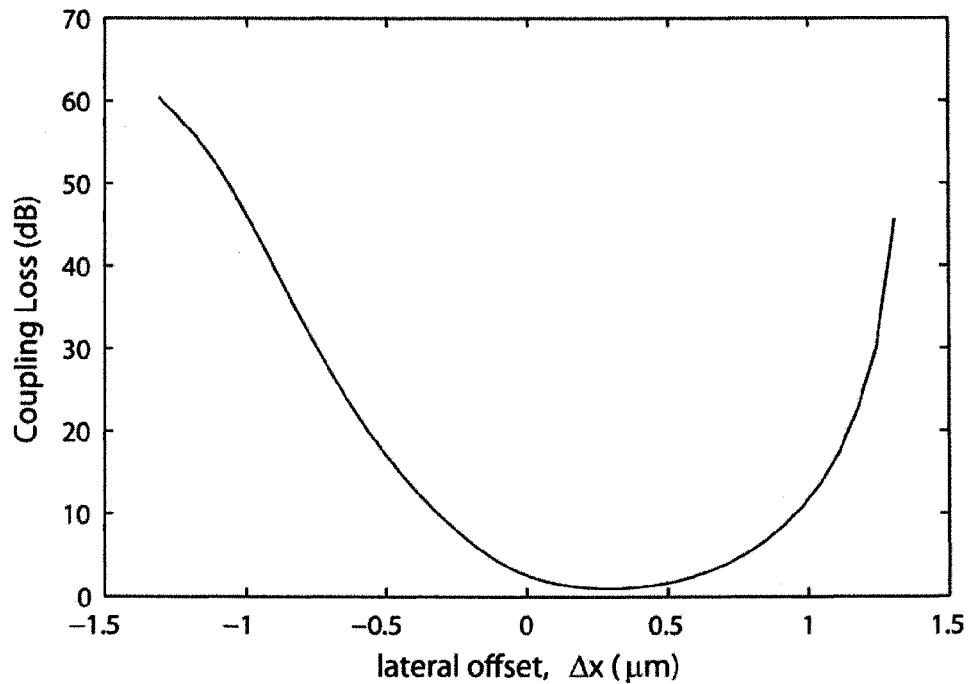
FIG. 10B shows the coupling loss between a straight ($r_0 \to \infty$) and curved ($r_0$=0.4 ®m) MDW as a function of the lateral offset Δx; both MDWs are dimensioned with w=1.7 µm, $w_b$=200 nm, s=300 nm, t=100 nm.

Comparing FIGS. 9A and 9B reveals that the curved MDW mode (FIG. 9B) is de-centered and deformed compared to the straight one (FIG. 9A), suggesting that, in an end-to-end connection (i.e.: a butt-coupling), the waveguides should be offset laterally from each other in order to align the modes and minimize the coupling loss. More particularly, FIG. 10A shows in top view a straight ($r_0 \to \infty$) MDW 30 butt-coupled to a curved MDW 32 with a centre-to-centre lateral offset of $\Delta x$. FIG. 10B shows the transition loss computed between a straight ($r_0 \to \infty$) and curved ($r_0=0.4$ μm) MDW as a function of the lateral offset $\Delta x$; both MDWs are dimensioned with $w=1.7$ μm, $s=300$ nm, $t=100$ nm and $w_b=200$ nm. The transition loss is calculated by computing the overlap integral between the main $E^p_{11}$ mode field component ($E_\rho$) of the straight and curved sections. FIG. 10B shows that a slight (outward) offset of $\Delta x \sim 300$ nm reduces the transition loss to <1 dB compared to 3.6 dB with no offset.

Figure 11A:
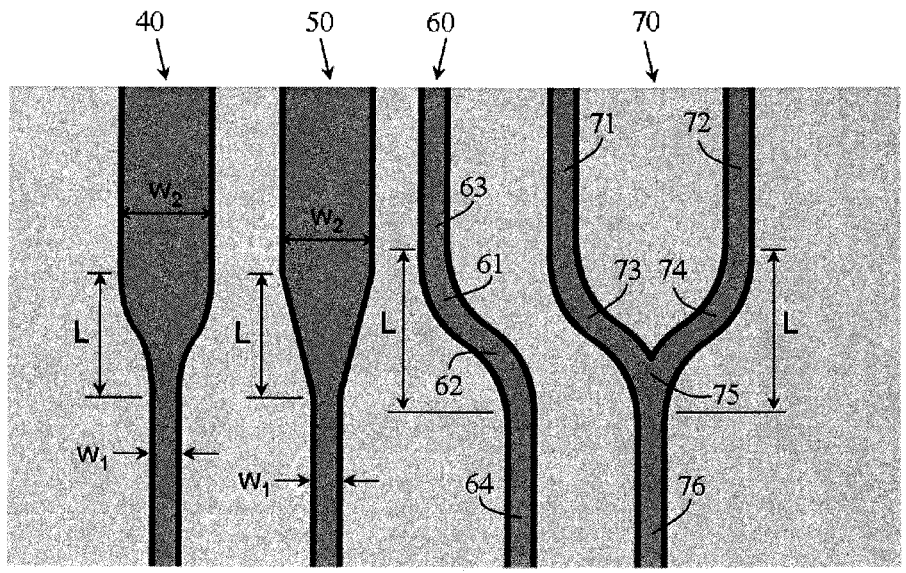
FIGS. 11A and 11B show as top views examples of components constructed with the MDW.
Figure 11B:
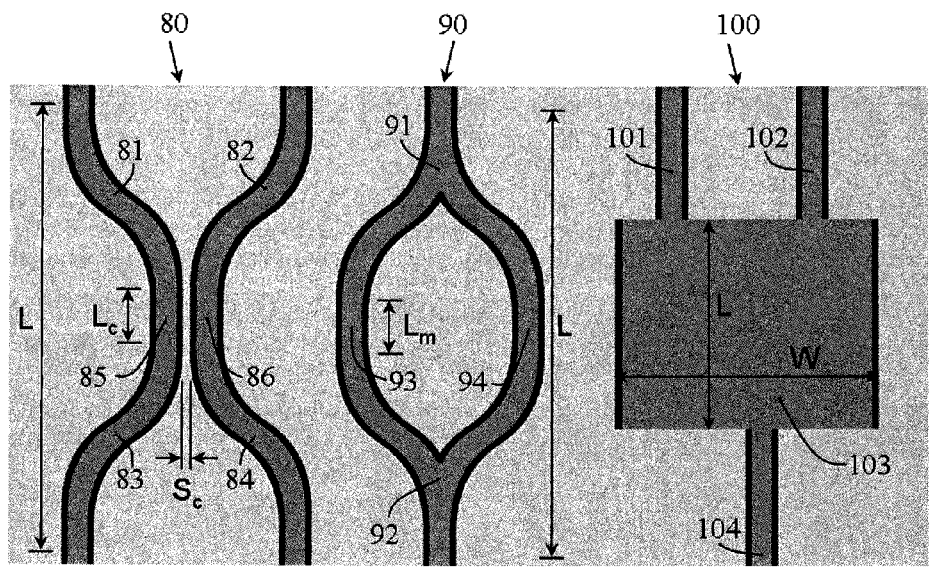

Components:

FIGS. 11A and 11B show in top view some example components constructed with the MDW.

A curved transition 40 can be implemented to join two straight MDW sections of different widths $w_1$ and $w_2$ by curving out the narrow width $w_1$ to the wide width $w_2$ over a short distance L. A linear transition 50 can be implemented to join two straight MDW sections of different widths, $w_1$ and $w_2$, by flaring out the narrow width $w_1$ to the wide width $w_2$ over a short distance L. Using substantially non-radiative MDWs advantageously allows a short non-radiative transition of length L between wide and narrow MDW sections.

An S-bend 60, useful for redirecting optical radiation, is implemented by interconnecting straight MDWs 63 and 64 through two oppositely curved MDW sections 61 and 62. Offsetting the sections 61, 62, 63 and 64 laterally (not shown), in the manner sketched in FIG. 10A, reduces the transition losses between the oppositely curved sections 61/62 and between the curved and straight sections 61/63, and 62/64. Using substantially non-radiative MDWs advantageously allows a short non-radiative S-bend length L.

A Y-junction 70, useful for splitting or combining optical radiation, is implemented by connecting straight sections 71 and 72 to interconnected mirrored S-bends 73 and 74, the S-bends themselves being connected to straight section 76 through short transition 75. Using substantially non-radiative MDWs advantageously allows a short non-radiative Y-junction length L.

A coupler 80, useful for splitting or combining optical radiation, is implemented by connecting straight parallel sections 85 and 86 to respective S-bends 81/83 and 82/84, the length $L_c$ and separation $S_c$ of the parallel sections 85 and 86 determining the coupling ratio of the coupler. Using substantially non-radiative MDWs advantageously allows short non-radiative S-bends and thus a coupler of short overall length L.

A Mach-Zehnder interferometer (MZI) 90, useful for monitoring the interference of optical radiation, is implemented by connecting straight parallel sections 93 and 94 to a pair of Y-junction splitters 91 and 92, the length $L_m$ of the parallel sections 93 and 94 determining in part the difference in insertion phase between the modes propagating thereabove. Using substantially non-radiative MDWs advantageously allows short non-radiative Y-junctions.

A multimode interferometer (MMI) 100, useful for splitting or combining optical radiation, is implemented by connecting straight sections 101 and 102 to a wider section 103 of length L and width W. The wider section 103 propagates the fundamental ($E^p_{11}$) and higher-order ($E^p_{21}$, $E^p_{31}$, ...) modes, and its length L and width W are selected such that interference of these modes when excited by section 104 produces a prescribed splitting at sections 101 and 102. Alternatively, N sections could be connected in this manner to section 103 instead of 2 (101, 102) as sketched.

Specific dimensions for these components (FIGS. 11A and 11B) can be determined by modeling using the procedures described in [6, 7, 11] in order to achieve desired performance characteristics.

Figure 12:
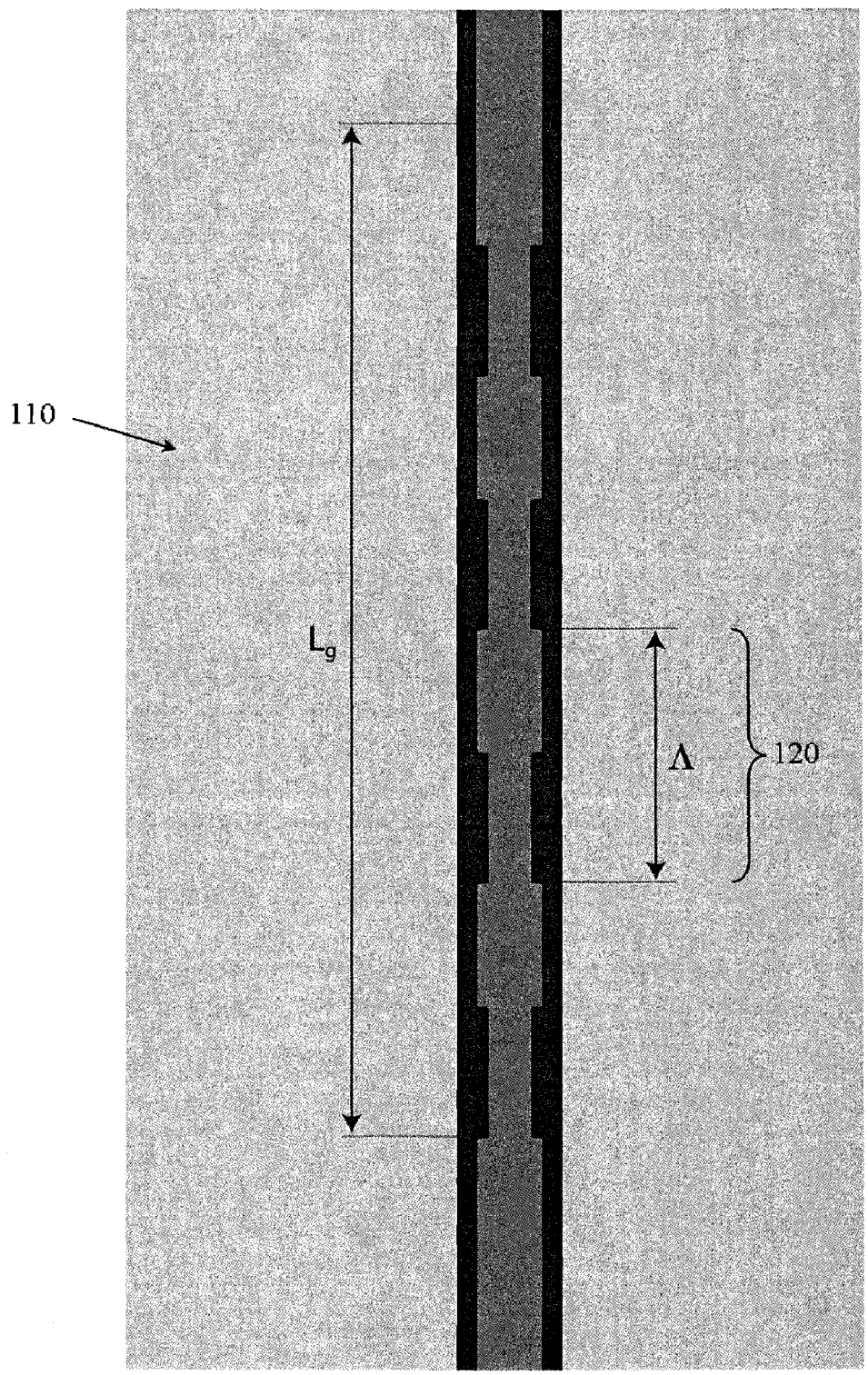
FIG. 12 shows as a top view a MDW Bragg grating of length $L_g$.

Gratings:

FIG. 12 shows in top view a MDW Bragg grating 110 of length $L_g$ constructed by concatenating unit cell 120 N times. The length of the grating $L_g$ is then given by $L_g=N\Lambda$ where $\Lambda$ is the grating period and length of a unit cell.

Figure 13A:
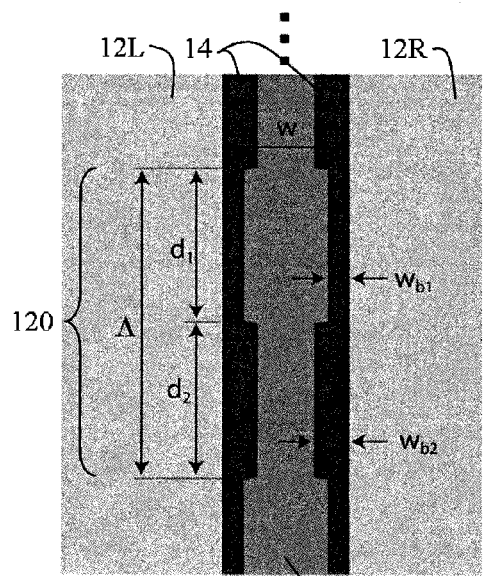
FIGS. 13A, 13B and 13C are magnified top views of three different unit cell designs that can be used to implement the grating of FIG. 12.
Figure 13B:
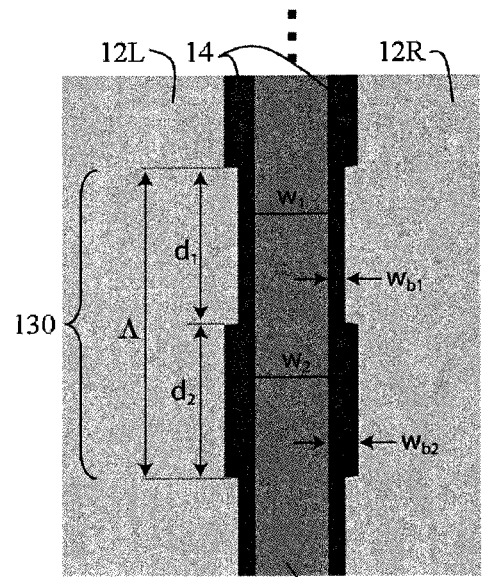
Figure 13C:
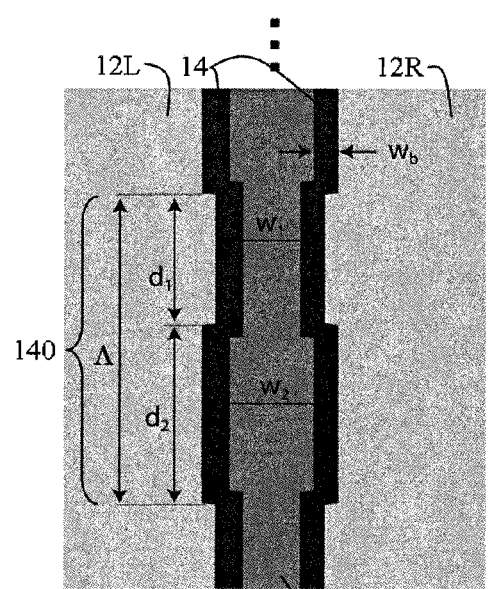

FIG. 13A shows a magnified top view of unit cell 120 created by maintaining the width w of the MDW constant and stepping the width of the dielectric plugs 14 from $w_{b1}$ to $w_{b2}$ over lengths $d_1$ and $d_2$, respectively, defining the period $\Lambda=d_1+d_2$. FIG. 13B shows an alternative unit cell design where the width of the MDW is stepped from $w_1$ to $w_2$ and the width of the dielectric plugs 14 is stepped from $w_{b1}$ to $w_{b2}$ over lengths $d_1$ and $d_2$, respectively, defining the period $\Lambda=d_1+d_2$. FIG. 13C shows yet another alternative unit cell design where the width $w_b$ of the dielectric plugs 14 is maintained constant and the width of the MDW is stepped from $w_1$ to $w_2$ over lengths $d_1$ and $d_2$, respectively, defining the period $\Lambda = d_1 + d_2$.

Referring to FIG. 2A, the grating designs depicted in FIGS. 12, 13A, 13B and 13C can be applied to the bottom dielectric plugs 14 and bottom metal plates 12L and 12R only, to the top dielectric plugs 14 and top metal plates 12L and 12R only, or to both the top and bottom dielectric plugs 14 and top and bottom metal plates 12L and 12R.

Specific grating dimensions can be determined by modeling using the procedures described in [25], in order to achieve desired performance characteristics.

Electro-Optic Devices:

Using an electro-optic material, such as an electro-optic crystal (e.g.: $LiNbO_3$, PLZT) or an electro-optic polymer (or other), as the dielectric slab 10 confers additional functionality to the MDW.

Figure 14:
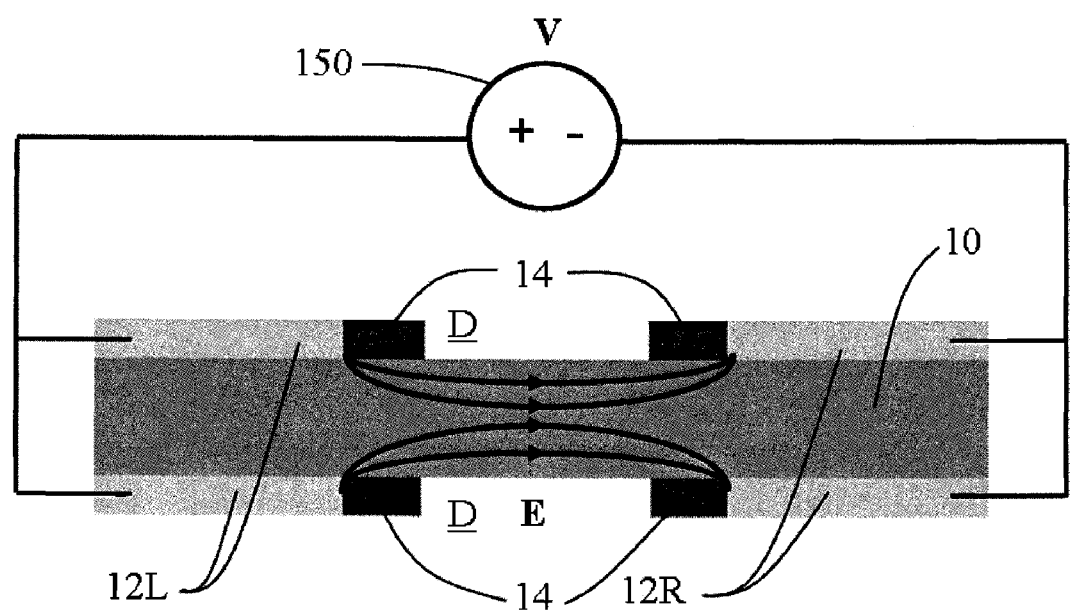
FIG. 14 shows metal parallel-plates used to apply a transverse electric field E to the dielectric slab of the MDW through connections to a voltage source.
Figure 15A:
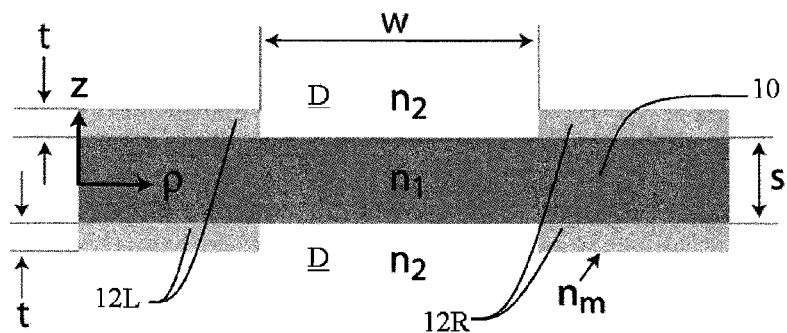
FIG. 15A illustrates as a front cross sectional view an alternative MDW embodying the present invention.
Figure 15B:
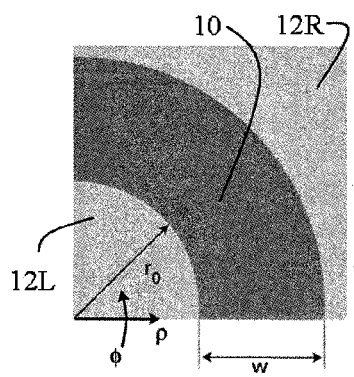
FIGS. 15B and 15C illustrate in top view 90° curved sections of an alternative MDW with an arbitrary radius of curvature $r_0$, and with $r_0$=0, respectively.
Figure 15C:
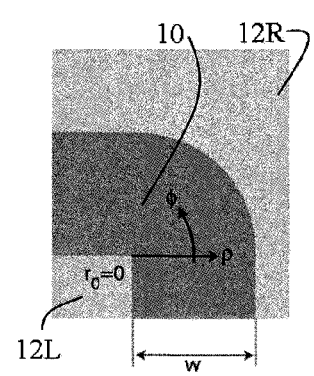
Figure 15D:
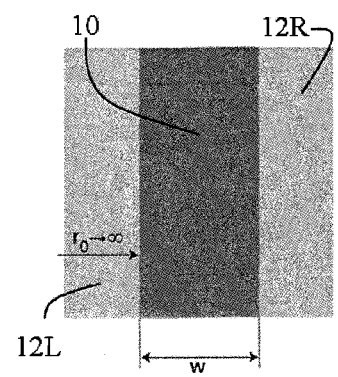
FIG. 15D illustrates in top view a straight section ($r_0 \to \infty$) of an alternative MDW.
Figure 15E:
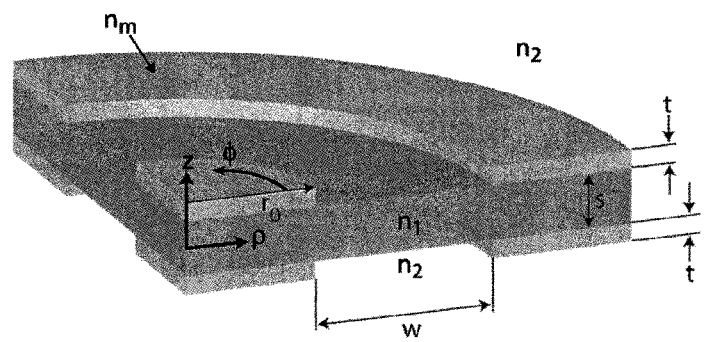
FIG. 15E illustrates in isometric view a 90° curved section of an alternative MDW with an arbitrary radius of curvature $r_0$.

The metal parallel-plates 12L and 12R are advantageously used to apply a transverse (horizontal) electric field E to the electro-optic dielectric slab 10 through connections to a voltage source 150, as sketched in FIG. 14. Voltage source 150 may have DC and AC components. As discussed above with reference to FIG. 2A, the fundamental horizontally-polarized mode ($E^p_{11}$) occupies the area w×s (roughly) of Region I (see FIGS. 2A, 6B and 9A), so the applied electric field E is polarization-aligned and overlaps almost perfectly with the $E^p_{11}$ mode. The applied electric field modifies the refractive index $n_1$ of the electro-optic dielectric slab 10 through its electro-optic effect thus imparting a phase shift to the $E^p_{11}$ mode. In the case of $LiNbO_3$ (or a similar crystal) using an x-cut layer as the electro-optic dielectric slab 10 is particularly advantageous because the strongest electro-optic coefficient ($r_{33}$) is exploited (i.e.: $n_1 = n_e - 0.5 n_e^3 r_{33} E$ where $n_e$ is the extraordinary index). In the case of an electro-optic polymer, the metal plates 12L and 12R provide a further advantage in that they are used to poll the material post-deposition to engender or enhance its electro-optic effect prior to use.

Any of the MDW components depicted in FIGS. 2A-2E, 11A-11B, 12, and 13A-13C can be enhanced by using an electro-optic material as the dielectric slab 10 and connections to a voltage source as depicted in FIG. 14. In the case of the straight MDW (FIG. 2D), the resulting structure operates as a phase shifter. In the case of the directional coupler 80 (FIG. 11B), applying voltages to the straight parallel sections 85 and 86 creates a switch, a modulator or a wavelength filter. In the case of the MZI 90 (FIG. 11B), applying voltages to the straight parallel sections 93 and 94 creates a variable attenuator or an intensity modulator. Combining electro-optic couplers (80) and MZIs (90) creates variable multiplexers and tunable filters. In the case of the gratings 110 (FIG. 12) with unit cells 120, 130 or 140 (FIGS. 13A-13C), applying a voltage creates a tunable reflection peak which in turn is used to create a tunable filter.

Thermo-Optic Devices:

In like manner, using a thermo-optic material, such as a polymer (or other), as the dielectric slab 10 confers additional functionality to the MDW. In this case, the metal parallel-plates 12L and 12R are advantageously used to heat the dielectric slab 10 through resistive heating by connecting each metal plate to its own (or to a common) current source. Any of the MDW components depicted in FIGS. 2A-2E, 11A-11B, 12, and 13A-13C can be enhanced by using a thermo-optic material as the dielectric slab 10 and connections to a current source. The devices enabled by an electro-optic material (described above) can be implemented as thermo-optic devices.

Figure 16:
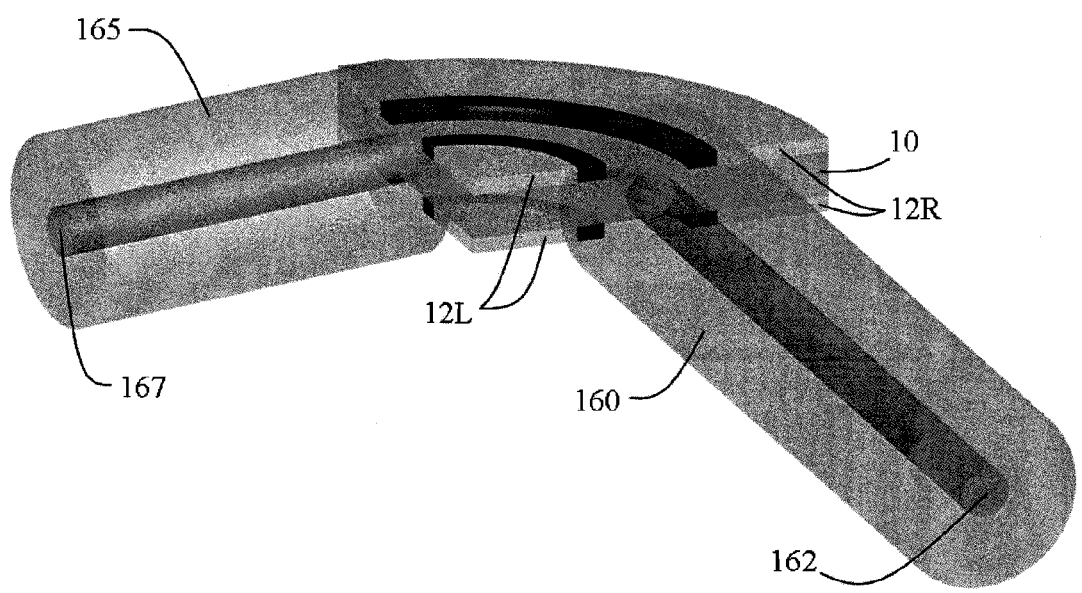
FIG. 16 illustrates in isometric view a 90° curved section of MDW having an arbitrary radius of curvature $r_0$ similar to that depicted in FIG. 2E, but with additional optical fibres connected to the input and output of the MDW.

Input and Output Means:

FIG. 16 illustrates in isometric view a 90° curved section of MDW having an arbitrary radius of curvature $r_0$, butt-coupled to input and output means 160 and 165, respectively, shown here as single-mode optical fibers. Alternatively, the means 160 or 165 may be tapered single-mode optical fibers, single-mode polarization-maintaining optical fibers or tapered single-mode polarization-maintaining optical fibers, or any other suitable optical waveguide means. The cores 162 and 167 of the optical fibers 160 and 165, respectively, are shown in FIG. 16 aligned with the area w×s of Region I, thus ensuring good overlap of the fiber modes with the $E^p_{11}$ mode propagating in the MDW. The overlap can be optimized by offsetting the optical fibers 160 and 165 toward the outside of the curve in the manner sketched in FIG. 10A, and as discussed with regards to FIGS. 10A and 10B. The $E^p_{11}$ mode is horizontally polarized, so good polarization alignment between the input fiber mode (160) and the $E^p_{11}$ mode is required. This can be readily achieved by controlling the polarization of the input mode using a polarization controller, or by coupling a polarized light source to a principle axis of a polarization-maintaining optical fiber and aligning this axis along the width of the MDW.

Materials and Fabrication:

The MDW (FIG. 2A) can be implemented using many combinations of materials. The general requirements are that the dielectric plugs 14 should have as high an index $n_b$ as possible, the dielectric slab 10 should have an index $n_1$ higher than that of the surrounding claddings D ($n_1 > n_2$), and the metal plates should be implemented using a metal having the lowest possible optical loss.

In the embodiments and calculations given throughout this disclosure, the free-space operating wavelength was set to $\lambda_0 = 1550$ nm, but embodiments of the invention may be arranged and configured to propagate radiation having any wavelength in the range encompassing the ultra-violet, through the visible, near infra-red, mid infra-red, far infra-red, down to millimeter-waves and microwaves.

In the embodiments and calculations given throughout this disclosure the dielectric slab 10 had an index close to that of $Si_3N_4$, the claddings D had an index close to that of $SiO_2$, the dielectric plugs 14 had an index close to that of Si, and the metal parallel-plates 12L and 12R had an index close to that of Au, but many other materials could be used. Good choices for the metal parallel-plates 12L and 12R include Au, Ag, Cu, Al but other metals such as Pt, Pd, Ti, Ni, Cr, Mo could be used. Good choices from which to choose for the dielectric slab 10, claddings D and plugs 14 include $Si_3N_4$, $SiO_2$, $TiO_2$, polymers, electro-optic materials ($LiNbO_3$, $LiTaO_3$, $BaTiO_3$, PLZT, KTP, KDP, DKDP, ADP, AD*P, PLZT, PZT), crystals, and semiconductors (Si, Ge, GaAs, InFP and variants thereof), the combination selected to fulfill the requirements described above.

The MDW and components can be manufactured on standard Si wafers (for example) using conventional fabrication techniques such as physical or chemical vapor deposition, evaporation, etching or lift-off, and optical or e-beam lithography.

Industrial Applicability

Embodiments of the present invention provide a low-loss optical waveguide structure that can curve or bend aggressively in the plane of propagation without radiating substantially. They may be used to implement integrated optical components, devices and circuits for routing or processing light. Advantageously, the waveguide and components (devices, circuits) are of relatively small size, at least in the context of conventional integrated optics, and can be manufactured by applying conventional fabrication techniques; these advantages when taken together may greatly reduce cost.

Although embodiments of the invention have been described and illustrated in detail, it is to be clearly understood that the same are by way of illustration and example only and not to be taken by way of limitation, the scope of the present invention being limited only by the appended claims.

References

[1] R. L. Espinola, R. U. Ahmad, F. Pizzuto, M. J. Steel, and R. M. Osgood, "A study of high-index-contrast 90 degrees waveguide bend structures," Opt. Express, vol. 8, no. 9, pp. 517-528, 2001.

[2] B. M. A. Rahman, D. M. H. Leung, S. S. A. Obayya, and K. T. V. Grattan, "Numerical analysis of bent waveguides: bending loss, transmission loss, mode coupling, and polarization coupling," Appl. Optics, vol. 47, no. 16, pp. 2961-2970, 2008.

[3] A. Sakai, G. Hara, and T. Baba, "Propagation characteristics of ultrahigh-delta optical waveguide on silicon-on-insulator substrate," Jpn. J. Appl. Phys. 2, vol. 40, no. 4B, pp. L383-L385, 2001.

[4] Y. A. Vlasov and S. J. McNab, "Losses in single-mode silicon-on-insulator strip waveguides and bends," Opt. Express, vol. 12, no. 8, pp. 1622-1631, 2004.

[5] P. Berini, "Long-range surface plasmon-polariton waveguides in silica," J. Appl. Phys., vol. 102, no. 5, pp. 053 105-1-8, 2007.

[6] P. Berini and J. Lu, "Curved long-range surface plasmon-polariton waveguides," Opt. Express, vol. 14, no. 6, pp. 2365-2371, 2006.

[7] R. Charbonneau, C. Scales, I. Breukelaar, S. Fafard, N. Lahoud, G. Mattiussi, and P. Berini, "Passive integrated optics elements used on long-range surface plasmon polaritons," J. Lightwave Technology, vol. 24, no. 1, pp. 477-494, 2006.

[8] A. Degiron and D. R. Smith, "Numerical simulations of long-range plasmons," Optics Express, vol. 14, no. 4, pp. 1611-1625, 2006.

[9] A. Degiron, C. Dellagiacoma, J. G. McIlhargey, G. Shvets, O. J. F. Martin, and D. R. Smith, "Simulations of hybrid long-range plasmon modes with application to 90 degrees bends," Optics Letters, vol. 32, no. 16, pp. 2354-2356, 2007.

[10] A. Degiron, S. Y. Cho, C. Harrison, N. M. Jokerst, C. Dellagiacoma, O. J. F. Martin, and D. R. Smith, "Experimental comparison between conventional and hybrid long-range surface plasmon waveguide bends," Phys. Rev. A, vol. 77, no. 2, pp. 021 804-1-4, 2008.

[11] A. Boltasseva, T. Nikolajsen, K. Leosson, K. Kjaer, M. S. Larsen, and S. I. Bozhevolnyi, "Integrated optical components utilizing long-range surface plasmon polaritons," J. Lightwave Technol., vol. 23, no. 1, pp. 413-422, 2005.

[12] D. F. P. Pile and D. K. Gramotnev, "Channel plasmon-polariton in a triangular groove on a metal surface," Opt. Lett., vol. 29, no. 10, pp. 1069-1071, 2004.

[13] S. I. Bozhevolnyi, V. S. Volkov, E. Devaux, J. Y. Laluet, and T. W. Ebbesen, "Channel plasmon subwavelength waveguide components including interferometers and ring resonators," Nature, vol. 440, no. 7083, pp. 508-511, 2006.

[14] V. S. Volkov, S. I. Bozhevolnyi, E. Devaux, and T. W. Ebbesen, "Bend loss for channel plasmon polaritons," Appl. Phys. Lett., vol. 89, no. 14, pp. 143 108-1-3, 2006.

[15] B. Steinberger, A. Hohenau, H. Ditlbacher, A. L. Stepanov, A. Drezet,. R. Aussenegg, A. Leitner, and J. R. Krenn, "Dielectric stripes on gold as surface plasmon waveguides," Appl. Phys. Lett., vol. 88, no. 9, pp. 94 104-1-3, 2006.

[16] A. V. Krasavin and A. V. Zayats, "Passive photonic elements based on dielectric-loaded surface plasmon polariton waveguides," Appl. Phys. Lett., vol. 90, no. 21, pp. 211 101-1-3, 2007.

[17] T. Yoneyama and S. Nishida, "Nonradiative dielectric waveguide for millimeter-wave integrated-circuits," IEEE T. Micro. Theory, vol. 29, no. 11, pp. 1188-1192, 1981.

[18] T. Yoneyama and S. Nishida, "Nonradiative dielectric waveguide circuit components," Int. J. Infrared Milli., vol. 4, no. 3, pp. 439-449, 1983.

[19] T. Yoneyama, "Nonradiative dielectric waveguide," in "Infrared and millimeter waves," Vol. 11, Millimeter components and techniques, part III, Academic Press, 1984, pp. 61-98.

[20] T. Yoneyama, H. Sawada, and T. Shimizu, "Nrd-guide passive components and devices for millimeter wave wireless applications," IEICE T. Electron., vol. E90C, no. 12, pp. 2170-2177, 2007.

[21] F. Kusunoki, T. Yotsuya, J. Takahara, and T. Kobayashi, "Propagation properties of guided waves in index-guided two-dimensional optical waveguides," Applied Physics Letters, vol. 86, no. 21, pp. 211 101-1-3, 2005.

[22] R. Buckley and P. Berini, "Radiation Suppressing Metallo-Dielectric Optical Waveguides", submitted

[23] R. Buckley and P. Berini, "Long-Range Substantially Nonradiative Metallo-Dielectric Waveguide", Optics Letters, in press.

[24] C. Chen, P. Berini, D. Z. Feng, S. Taney, and V. P. Tzolov, "Efficient and accurate numerical analysis of multilayer planar optical waveguides in lossy anisotropic media," Opt. Express, vol. 7, no. 8, pp. 260-272, 2000.

[25] S. Jetté-Charbonneau and P. Berini, "Theoretical performance of Bragg gratings based on long-range surface plasmon-polariton waveguides," J. Opt. Soc. Am. A, vol. 23, pp. 1757-1767, 2006.

The invention claimed is:

1. A device comprising a waveguide structure for propagating electromagnetic radiation formed by:
   a slab (10) of dielectric material;
   a first pair of metal plates (12L) and a second pair of metal plates (12R) each pair comprising a first and a second metal plate extending in a propagation direction on opposite faces of the slab;
   the plates on each face of the slab (10) being spaced apart laterally with respect to the propagation direction;
   dielectric cladding material (D) disposed along each of the opposite faces of the slab and having a refractive index less than the refractive index of the slab, and
   a plurality of plugs (14) of dielectric material each plug extending alongside an inwardly-facing edge of a respective one of the four metal plates (12L, 12R), the refractive index of each of the dielectric plugs being greater than the respective refractive indices of the slab (10) and the cladding material,
   the device further comprising input means for injecting electromagnetic radiation into the slab to propagate in said propagation direction in a zone defined by and between the four metal plates.

2. A device according to claim 1, wherein each of the plates on one face of the slab (10) is substantially in register with the corresponding plate on the opposite face of the slab.

3. A device according to claim 1, wherein the lateral spacing (w) between said plates is in the range from about 0.05 microns to about 10 microns, the thickness (s) of the slab (10) is in the range from about 0.05 microns to about 10 microns, and the thickness (t) of the metal plates is in the range from about 3 nm to about 1000 nm.

4. A device according to claim 1, wherein the slab (10) comprises silicon nitride, the dielectric plugs (14) comprise silicon, the dielectric claddings (D) comprise silicon dioxide and the metal plates comprise gold or silver, the lateral spacing (w) between said plates is in the range from about 0.05 microns to about 10 microns, the thickness (s) of the dielectric slab is in the range from about 0.05 microns to about 10 microns, and the thickness (t) of the metal plates is in the range from about 3 nm to about 1000 nm.

5. A device according to claim 1, wherein the electromagnetic radiation has a wavelength in a range embracing ultraviolet, visible, near infra-red, mid infra-red, far infra-red, millimeter-waves and microwaves.

6. A device according to claim 1, wherein each plate is straight, curved, or bent in the plane of the metal plates.

7. A device according to claim 1, wherein said plates are curved concentrically in the plane of the plates.

8. A device according to claim 7, further comprising a second waveguide structure coupled endwise to the first-mentioned waveguide structure and offset radially outwardly relative thereto.

9. A device according to claim 1, wherein each plate is curved or bent in the plane of the metal plates and has a radius of curvature that is substantially zero for the innermost of each pair of plates on the same surface.

10. A device according to claim 1, further comprising output means for receiving from said slab (10) electromagnetic radiation that has propagated in said zone.

11. A device according to claim 1, wherein at least a portion of the slab between the first and second plates is thermo-optic and means is provided for passing a current through one or more of the metal plates to cause resistive heating and heat the thermo-optic portion of the slab.

12. A device according to claim 1, further comprising a voltage source connected between said first and second plates of at least one said pair for establishing a potential difference in a portion of the slab between the first and second plates, at least said portion being voltage sensitive.

13. A device according to claim 1 wherein said waveguide structure (40, 50) comprises a first section having a first width, a second section having a second width less than the first width and a transition section varying in width between said first width and said second width and interconnecting respective ends of the first and second sections.

14. A device according to claim 13, wherein edges of the transition section are curved and symmetrical about a longitudinal axis of the first waveguide structure.

15. A device according to claim 13, wherein the transition section tapers linearly between first and second ends having said first and second widths, respectively.

16. A device according to claim 1, wherein said waveguide structure comprises a first section and a second section interconnected by a generally S-shaped intermediate section so that said first and second sections extend generally parallel to each other but offset laterally.

17. A device according to claim 16, further comprising a third waveguide section connected to the first waveguide section by a second generally S-shaped intermediate section symmetrical to the first intermediate section so that the second and third waveguide sections are offset oppositely relative to the first waveguide section to form a Y-junction.

18. A device according to claim 17, further comprising fourth, fifth and sixth waveguide sections interconnected by further S-shaped sections to form a second Y-junction configuration, the two Y-junctions having respective arms connected by further straight waveguide sections to form a Mach Zehnder interferometer.

19. A device according to claim 1, wherein the waveguide structure comprises first and second sets of waveguide structure sections arranged to form a coupler, each set of waveguide structure sections comprising two spaced sections and a middle section, opposite ends of the middle section connected by a pair of S-shaped waveguide sections to respective ends of the two spaced waveguide structure sections, the first and second sets of waveguide structure sections being disposed so that the two middle sections extend parallel and adjacent to each other with a separation that determines a coupling ratio therebetween for electromagnetic radiation injected into one of said sets of waveguide structure sections by said input means.

20. A device according to claim 1, wherein the waveguide structure comprises two or more laterally spaced sections (101) and (102) connected to one side of a wider section (103) and a third waveguide section (104) connected to another side of the wider section (103) to form an interferometer, the wider section (103) having a width (W) greater than combined widths and spacing of the two or more sections, a length (L) and the width (W) of the wider section being selected so that when excited by electromagnetic radiation via said third section (104) the wider section (103) propagates the fundamental ($E\rho_{11}$) and higher-order ($E\rho_{21}$, $E\rho_{31}$, ...) modes, and interference of these modes when excited by electromagnetic radiation via section 104 produces a prescribed splitting at said two or more laterally spaced sections (101, 102).

21. A device according to claim 1, wherein said waveguide structure comprises a plurality of concatenated cells forming a Bragg grating, each cell comprising a waveguide section whose metal plates of each pair have mutually opposed edges uniformly spaced and whose corresponding dielectric plugs have a width that is stepped between a first width ($w_{b1}$) and second width ($w_{b2}$) narrower than the first width over first and second lengths ($d_1$ and $d_2$), respectively, defining grating period $\Lambda = d_1 + d_2$.

22. A device according to claim 1, wherein said waveguide structure comprises a plurality of concatenated cells forming a Bragg grating, each cell comprising a waveguide section whose metal plates of each pair have mutually opposed edges stepped and whose corresponding dielectric plugs have outermost edges stepped complementarily to the metal plates, the innermost opposed edges of the dielectric plugs being substantially parallel so that the width of the dielectric cladding is uniform and the width of each dielectric plug varies between a first width ($w_{b1}$) and a second wider width ($w_{b2}$) over first and second lengths ($d_1$ and $d_2$), respectively, defining grating period $\Lambda = d_1 + d_2$.

23. A device according to claim 1, wherein said waveguide structure comprises a plurality of concatenated cells forming a Bragg grating, each cell comprising a waveguide section whose metal plates of each pair have mutually opposed edges stepped and whose corresponding dielectric plugs have outermost edges stepped complementarily to the metal plates, the innermost opposed edges of the dielectric plugs also being stepped so that the width ($w_b$) of the dielectric cladding between transitions is equal and opposite edges of the dielectric cladding are stepped between a first width ($W_1$) and a second wider width ($W_2$) over lengths ($d_1$ and $d_2$), respectively, defining grating period $\Lambda = d_1 + d_2$.

* * * * *